United States Patent [19]

Hadden

[11] Patent Number: 4,836,720
[45] Date of Patent: Jun. 6, 1989

[54] DRILL GUIDE

[76] Inventor: Terrence B. Hadden, 1745 De Séve, apt. 3, Montreal, Quebec, Canada, H4B 2B1

[21] Appl. No.: 209,931

[22] Filed: Jun. 22, 1988

[51] Int. Cl.4 ............................................. B23B 45/14
[52] U.S. Cl. .................... 408/112; 248/601; 403/166; 403/377; 408/16; 408/75; 408/115 R; 408/241 S
[58] Field of Search ............... 408/72 R, 75, 110–112, 408/115 R, 16, 95, 99, 24 S, 712; 248/162.1, 188.5, 600, 601, 616; 403/166, 377; 267/137, 170, 178; 144/104, 106

[56] References Cited

U.S. PATENT DOCUMENTS

| | | | |
|---|---|---|---|
| 2,389,314 | 11/1945 | Imhof et al. | 408/112 |
| 2,674,906 | 4/1954 | Timpner | 408/112 X |
| 2,997,900 | 8/1961 | Pugsley | 408/112 X |
| 4,179,231 | 12/1979 | Hadden | 408/112 |
| 4,349,301 | 9/1982 | Boyajian | 408/112 |

*Primary Examiner*—Steven C. Bishop
*Attorney, Agent, or Firm*—Foley, Lardner, Schwartz, Jeffery, Schwaab, Mack, Blumenthal & Evans

[57] ABSTRACT

A hand drill guide comprising an annular base and a plurality of telescopic leg assemblies distributed along the base. Each assembly has a hollow cylinder, fixed perpendicularly at one end to the base, and a rod slidably mounted in the cylinder, the rod extending out of the cylinder through an opening. The drill guide also comprises an annular positioning head to which the other ends of the rods are fixed, and an annular drill holding assembly mounted for selective location on the cylinders. The rod has a retaining ring rigidly connected thereto at a given distance from its upper end to prevent the rod from escaping from the cylinder. A ring is floatingly mounted on the upper portion of the rod inside the cylinder and two springs act on the floating ring: one between it and the upper end of the cylinder and the other between it and the retaining ring, both springs being uncompressed when the retaining ring is adjacent to the bottom end of the cylinder. A stiffening annular member preferably interconnect the cylinders at their open ends. In addition, the positioning head is preferably provided with a manually operable finger which can be moved to show where the center of the drill guide is located, that is where the hole is to be drilled.

17 Claims, 3 Drawing Sheets

DRILL GUIDE

BACKGROUND OF THE INVENTION

1. Field of the invention

The present invention relates to a hand drill guide for use in firmly supporting a hand drill during operation and, more important so, ensuring that the drill bit is perpendicular at all times to the surface of the member being drilled, being a wall, a floor, a ceiling, a sheet, a plank or any similar member having a flat outer surface.

More particularly, the invention is concerned with an improvement to the drill guide disclosed and claimed in U.S. Pat. No. 4,179,231 issued on Dec. 18, 1979 to the same inventor.

2. Description of the prior art

The above mentioned U.S. Pat. No. 4,179,231 discloses a hand drill guide comprising an annular base around which a plurality of telescopic legs are distributed. Each leg comprises a hollow cylinder in which is slidably mounted a rod provided with a retaining head at one end. The rod with its head acts as a piston that is snugly mounted in the cylinder. One end of the cylinder is closed and fixed to the base from which it projects perpendicularly. The other end of the cylinder is open and defines an annular seat for the piston, the rod extending of course out of the cylinder through this annular seat. The hand drill guide also comprises an annular positioning head which is secured to the free ends of the rods. This head is intended to be applied firmly against the surface of the member to be drilled. The hand drill guide further comprises a drill holding assembly provided with a centering receptable into which may be inserted the chuck of a hand drill. The drill holding assembly is mounted selectively at one of several possible locations along the cylinders depending on the size of drill bit being used. Finally, each cylinder contains one spring that presses the piston-shaped rod firmly on the cylinder seat when the hand drill guide is idle. In use, force is applied on the hand drill which has its collar and chuck lodged into the aforesaid centering receptacle of the holding assembly fixed to the cylinders. This force thus moves the cylinders, the drill holding assembly and the base bodily toward the member to be drilled and drives the drill bit into it against the bias of the springs in the cylinders acting on the piston-shaped rods.

This hand drill guide is rather efficient in use. However, it has been found in practise that its structure should be improved to increase its stability when its telescopic legs are fully extended at the start of the drilling operation. In this extended position, there is indeed a lack of proper lateral support for the piston-shaped rods in the cylinders whatever be the thickness of the solid ring used as piston-head. This instability is more particularly due to the necessary considerable difference in axial length between the rods outside the cylinders and the retaining rings acting as piston heads inside the same. Wobbling or joggling is quite heavy when drilling is started and it decreases gradually to become acceptable only after the rod heads have moved to an appreciable distance from their annular seats at which time the rods attain a more important leverage action.

Another inconvenience with the head drill guide disclosed and claimed in the prior patent is that there is no positive way to ensure that the center of the annular position head, applied against the member to be drilled, lies directly over the point where the hole is to be drilled. Therefore, it is necessary in practise to proceed by trial and error.

SUMMARY OF THE INVENTION

A first object of the present invention is to provide a drill guide capable of avoiding the aforesaid wobbling of the rods relative to the cylinders and thereby of the positioning head and drill bit, by providing a new telescopic leg structure whereby the slidable rods have a greater leverage in the cylinders.

This first object is achieved by providing each rod with a retaining ring that is rigidly connected thereto at a given distance from the upper end of the rod, and with a floating ring that is slidably mounted along the upper portion of the rod above the retaining ring, and kept in equilibrium around the rod by a pair of springs located one on each side of the floating ring. In this manner, and right from the start, stability of the rods relative to the cylinders is greatly enhanced by the presence of the floating rings which stand at a given distance from the rod-retaining rings and snugly ride along the bores of the cylinders for greater efficiency.

More specifically, in accordance with the first object of the invention, there is provided a hand drill guide of the type comprising:

- an annular base provided with a central bore large enough to allow displacement thereacross of a collar and chuck of a hand drill;
- a plurality of telescopic leg assemblies distributed along said base and projecting perpendicularly therefrom, each leg assembly comprising a hollow cylinder having one end fixed to and closed by the base and another end closed by an end wall provided with a central opening, and a rod having an upper end, a lower end and having an upper portion slidably mounted in the cylinder, the rod extending out of the cylinder through the opening in the end wall thereof;
- an annular positioning head suitable for lying firm against a surface of a member to be drilled, this positioning head having a central bore and being connected to the lower ends of the rods and extending parallel to the base;
- an annular drill holding assembly; and
- means for mounting said drill holding assembly between the cylinders selectively at one of a plurality of locations along the cylinders.

This hand drill guide is improved in that, in each of the leg assemblies:

- the rod comprises a retaining ring rigidly connected thereto at a given distance from the upper end of the rod inside the cylinder to prevent this rod from escaping from the cylinder;
- a ring is floatingly mounted around the upper portion of the rod above, the retaining ring, this floating ring being snugly slidable in the cylinder;
- a first spring is mounted inside the cylinder around the rod between the floating ring and the retaining ring; and
- a second spring is mounted inside the cylinder between the floating ring and said one end of the cylinder closed by the base;
- said first and second springs holding the floating ring in a position adjacent the upper end of the rod when the retaining ring rests against the end wall of the cylinder and the first and second springs are uncompressed.

Preferably, there is provided a stiffening annular member connected to each of the other ends of the cylinders.

Another object of the invention is to provide a drill guide having, on the annular positioning head, a center finding finger manually movable from the inner periphery of the head toward an active position where its end points exactly to the center of the head so that the latter may be moved about until the tip of the finger is over the point where the hole is to be drilled. A spring bias thereafter moves the finger back to retracted position.

In accordance with this other object of the invention, the annular drill holding assembly and the annular positioning head have centers that lie along a common axis and the head is formed with a cavity opening into the bore, in which is located a center-finding finger. Means are provided to mount the finger in the cavity for pivotal movement about an axis parallel to the aforesaid common axis, between a retracted position of the finger and an active position wherein the other end of the finger indicates the center of the head on the common axis. Means are also provided to bias the finger to the retracted position and, additionally, manually operable means being provided to move the finger into the center-indicating position against the biasing means.

A third object of the invention is to provide a telescopic leg assembly comprising:
- a hollow cylinder having one closed end and another end closed by an end wall provided with a central opening;
- a rod having an upper end, a lower end and an upper portion slidably mounted in the cylinder, this rod extending out of the cylinder through said opening in the end wall;
- a retaining ring rigidly connected to the rod at a given distance from its upper end inside the cylinder to prevent this rod from escaping from said cylinder;
- a ring floatingly mounted around the upper portion of the rod above the retaining ring, this floating ring being snugly slidable in the cylinder;
- a first spring mounted inside the cylinder around the rod between the floating ring and the retaining ring; and
- a second spring mounted in the cylinder between the floating ring and the one closed end of the cylinder;
- the first and second springs holding the floating ring in a position adjacent the upper end of the rod when the retaining ring rests against the end wall of the cylinder and the first and second springs are uncompressed.

Other objects and advantages of the invention will appear from the non restrictive description that follows of a preferred embodiment thereof, given with reference to the appended drawings.

DESCRIPTION OF THE PREFERRED EMBODIMENT

Figure 1:
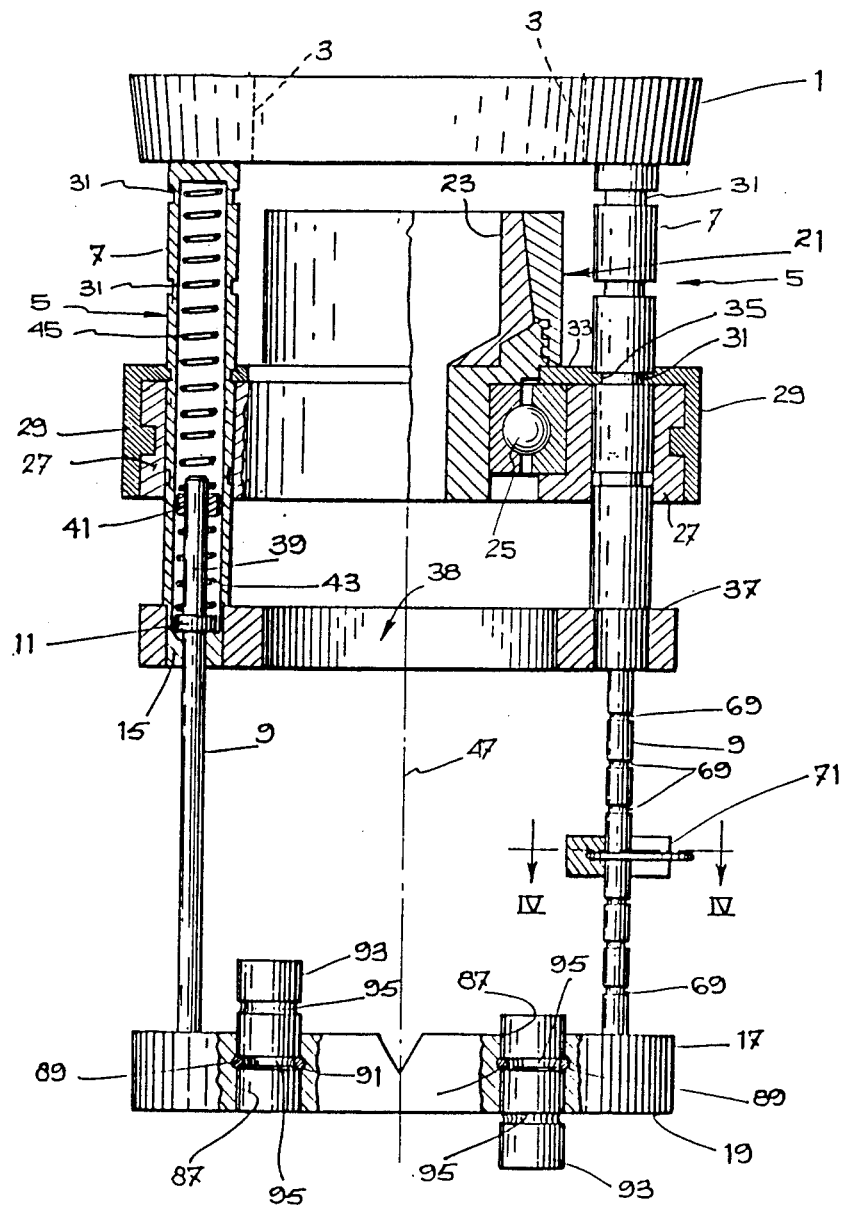
FIG. 1 is a diagrammatic elevation view, partly in cross-section, of a hand drill guide made according to the invention.
Figure 2:
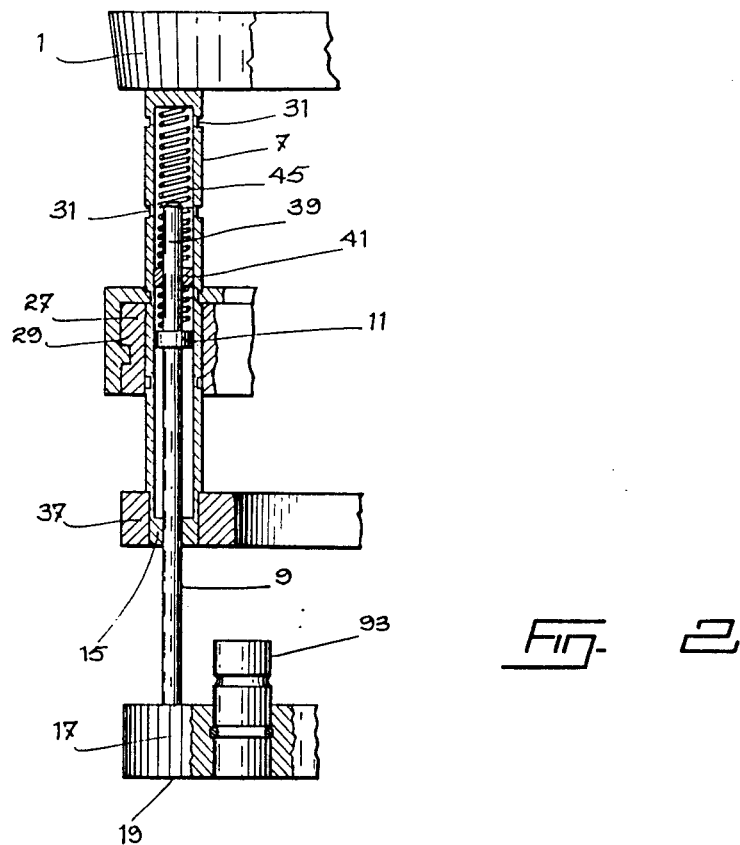
FIG. 2 is a view similar to FIG. 1 but of one side only of the hand drill guide.

The hand drill guide as shown in FIG. 1, comprises an annular base 1 having a central bore 3 large enough to allow passage of the collar and chuck of a hand drill (not shown). A plurality of like cylindrical telescopic leg assemblies 5 (two only being shown) are distributed along the base 1. As all leg assemblies 5 are alike, only one will be described.

Each leg assembly 5 comprises a hollow cylinder 7 which projects perpendicularly downwardly from the base, and a rod 9 telescopically slidable in the cylinder 7. The upper end of the cylinder 7 is threaded to the base 1 and closed by the same. The lower end of this cylinder is closed by an end wall 15 provided with a central opening. The rod 9 extends out of the cylinder 7 through the end wall 15 and has its lower end secured, in any known manner, to an annular positioning head 17 which is parallel to the base 1 and has an anti-slip lower surface 19 suitable for firm and steady application against a surface of a member to be drilled. To prevent the rods 9 from escaping from the cylinders 7 in which they are telescopically mounted, retaining rings 11 are provided for. Each ring 11 is rigidly connected to its rod 9 at a given distance from the upper end thereof.

Thus, the positioning head 17 is secured at the lower ends of the rods 9 which, in turn, are held in the cylinders 7 fixed to the base 1.

An annular drill holding assembly 21 can be mounted, in the manner described in the present inventor's prior U.S. Pat. No. 4,179,231, on the cylinders 7 selectively at one of a plurality of locations along the cylinders.

As shown in the accompanying drawings the assembly 21 comprises a tulip-shaped, centering receptacle 23 for receiving the chuck (not shown) of a hand drill. The receptacle 23 is mounted rotatably through an annular ball bearing 25, on a transverse plate 27. A manually operable locking cover 29 is rotatably mounted, to a limited extent, on the plate 27 which itself is constructed to be slidable along the cylinders 7, the latter being provided with a series of positioning grooves 31 for the selective location of the drill holding assembly 21.

To achieve such a selective location, the top surface 33 of the locking cover 29 has a series of arcuate elongated slots, one for each cylinder 7. Each slot has a narrow section 35 engageable in a groove 31 and a wide section (not shown) suitable for allowing passage of a cylinder 7 therethrough. By properly rotating the cover 29 from the position in FIG. 1, the narrow sections 35 of the arcuate slots are moved out of the grooves 31 which then move into the wide grooves thereby freeing the plate 27 and the drill holding assembly 21 to allow for its displacement along the cylinders 7. Counter rotation of the locking cover 29 may then move the narrow sections 35 back into the grooves 31 corresponding to the newly selected location for the drill holding assembly 21.

Spring means may be provided to move back the cover 29 in locking position and thus keep the assembly 21 in any selected location, displacement of the assembly 21 being only necessary where a drill bit of a different size is to be used.

For greater stability of the cylinders 7, their lower ends may advantageously be secured to a stiffening annular member 37 defining a central hole 38 of the same diameter as the central bore 3 of the base 1. This adds to the stability already provided by the drill holding assembly 21 through its transverse plate 27.

In accordance with the invention, greater leverage action of the rods 9 in the cylinders 7 and prevention of the aforesaid wobbling of each leg assembly 5 is achieved by using a "floating" ring 41 slidably mounted for free translation on the upper portion 39 of each rod 9 above the retaining ring 11. The ring 41 which is floatingly mounted around the upper portion 39 of the rod 9, is sized to be snugly slidable along the bore of the cylinder 7.

In the inactive condition of the drill guide shown in FIG. 1, the floating ring 41 is held close to the top of the upper rod portion 39 by means of a pair of springs, namely a first uncompressed spring 43 mounted around the rod between the retaining ring 11 and the lower face of the floating ring 41 and a second uncompressed spring 45 extending between the closed upper end of the cylinder 7 and the upper face of the floating ring 41.

As can now be understood, at the start of the drilling operation, when the hand drill is mounted on the drill holding assembly 21 and pressed down against the biassing action of the springs in the cylinders 7 towards the positioning head 17, the floating ring 41 mounted on the upper portion 39 of the rod 9 at a given distance over the retaining ring 11, provides this rod 9 with a much increased leverage action than would be achieved with a rod with a retaining head at one end as previously described in U.S. Pat. No. 4,179,231. This increases leverage action and thus substantially reduces wobbling at the time when it is most needed.

As the rod 9 moves further into the cylinder 7, the floating ring 41 gradually approaches the retaining ring 11 that is solid with the rod, and its leverage action likewise decreases. However, at the same time, a new leverage action gradually develops, because of the increasing portion of the rod 9 between the retaining ring 11 and the opening in the end wall 15 of the cylinder 7.

It should be noted also that, because the ring 41 floats, the biassing action of the springs 43 and 45 is the same as that of the single spring used in the drill guide of U.S. Pat. No. 4,179,231.

Figure 5:
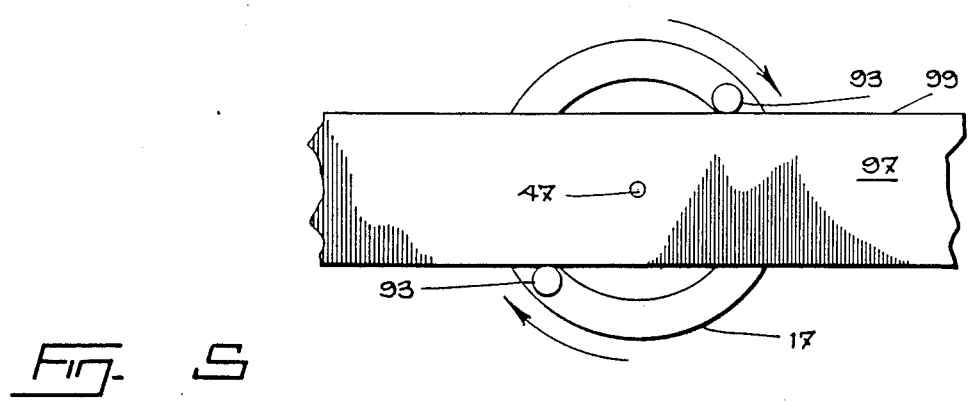
FIG. 5 is a bottom plan view of the annular positioning head applied over a narrow member for edge drilling.
Figure 3:
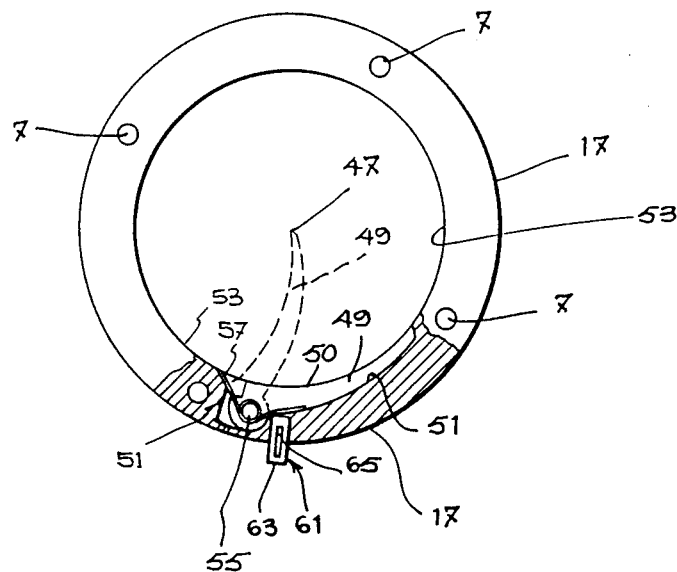
FIG. 3 is a plan view, partly broken away, of the annular positioning head.

In order that the drill bit be properly positioned perpendicularly to the member to be drilled, it is necessary that the centers of the annular drill holding assembly 21 and of the annular positioning head 17 lie along a common axis 47 (FIGS. 1, 3 and 5), perpendicular to the member. In use, it is also necessary that the axis 47 fall on the point where the hole is to be drilled. To accurately locate this point, the invention proposes the center-finding mechanism shown in FIG. 3.

This mechanism comprises an arcuate center-finding finger 49 retracted, in inactive position, in an appropriate cavity 51 formed in the bore 53 of the positioning head 17. Preferably, the cavity allows full insertion of the finger 49 so that its outer surface 50 be flush with the bore 53. The finger 49 is pivotally mounted at one end at 55 so that it can be moved from the retracted position to an extended active position, shown in broken lines, where its tip precisely indicates the center of the head 17 on the common axis 47, this center corresponding to the point of attack of the drill bit. Once the location where the hole to be drilled is marked by a point, it is then only necessary to shift the drill guide and head 17, with the center-finding finger 49 in extended active position, until the tip of the finger 49 and the marked point register with one another.

The finger 49 is normally biased to retracted position by a return spring 57 secured to the pivot 55 within the cavity 51.

Manually operable means 61 are used to move the finger 49 to its center-indicating position. The latter means 61 comprise a piston 63 extending laterally through the head 17 and into the cavity 51 to reach the finger 49. It is located preferably as close as possible to the pivot 55 and moves in the direction of the common axis 47. The stroke of the piston 63 is limited by a fixed pin 65 in the head 17 traversing an elongated slot 67 through the piston 63. Pressing on the piston 63 rotates the finger 49 against the bias of the spring 57. The complete stroke of the piston 63 when applied to move the finger 49, causes the movement of the finger tip to come to rest over the marked point on the common axis 47.

In accordance with the invention, stop means may be provided to limit the penetration of the drill bit into the member to be drilled.

Figure 4:
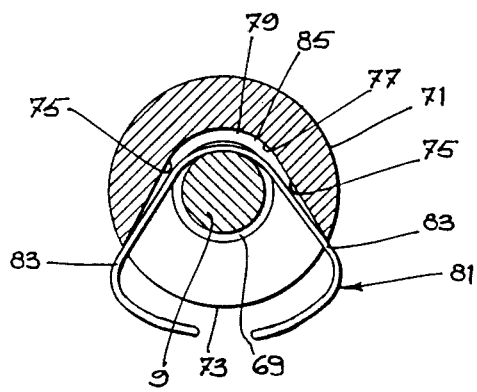
FIG. 4 is a cross-sectional view taken along line IV—IV of FIG. 1.

These stop means cooperate with circumferential grooves 69 (FIG. 1) spaced from one another along one of the rods 9, and are shown in detail in FIG. 4. They comprise a lock ring 71 slidable over the rod 9 and formed with an outwardly open generally triangular transverse slot 73 including two angular sidewalls 75 joined by an arcuate bottom wall 77 the diameter of which is larger than that of the rod 9 so as to define, inwardly of the bore of the lock ring 71, an arcuate release seat 79. Firm positioning of the lock ring in one of the grooves 69 is obtained by means of an angular resilient lock pin 81 having two straight side legs 83 joined by an arcuate central portion 85 of which the diameter is essentially equal, in uncompressed state of the pin, to that of the bottom of the rod groove 69. The construction of the lock pin 81 is such that, in use, the side legs 83 are biased against the slot sidewalls 75 and the central leg lies at the bottom of the rod groove 69 so that the ring 71 is locked on the rod 9. When the pin 81 is manually pushed in the slot 73, its two side legs 83 are pressed toward one another and its arcuate central portion 85 is moved out of the rod groove 69 and into the lock ring release seat 79 to thus free the lock ring 71 and allow to move it to another groove 69 of the rod 9.

Referring again to FIG. 1, it is seen that the positioning head 17 has a pair of diametrically opposed bores 87 (although not so shown for convenience) each formed with a circumferential groove 89 opening into the respective bore 87. Open spring rings 91 are lodged into the grooves 89 and partially project into the bores 87. A pair of centering plugs 93 are slidably mounted each in one bore 87. Each plug has a pair of spaced circumferential grooves 95 suitable to receive the projecting portions of the open rings 91. This construction allows the plugs to be projected away from the bottom surface 19 of the head 17, as at right in FIG. 1. This positioning of plugs 93 permits edge drilling of relatively thin members and since the plugs are diametrically located on the annular head 17, drilling may automatically be effected at the center of the edge surface 97 of a member 99 as clearly shown in FIG. 5. When not required, the plugs 93 are simply pushed in, as shown at left in FIG. 1.

What is claimed is:

1. In a hand drill guide of the type comprising:
    an annular base provided with a central bore large enough to allow displacement thereacross of a collar and chuck of a hand drill;

a plurality of telescopic leg assemblies distributed along said base and projecting perpendicularly therefrom, each leg assembly comprising a hollow cylinder having one end fixed to and closed by said base and another end closed by an end wall provided with a central opening, and a rod having an upper end, a lower end and having an upper portion slidably mounted in said cylinder, said rod extending out of the cylinder through the opening in the end wall thereof;

an annular positioning head suitable for lying firm against a surface of a member to be drilled, said positioning head having a central bore and being connected to the lower ends of the rods and extending parallel to the base;

an annular drill holding assembly; and means for mounting said drill holding assembly between said cylinders selectively at one of a plurality of locations along said cylinders; the improvement wherein, in each of said leg assemblies:

the rod comprises a retaining ring rigidly connected thereto at a given distance from the upper end of said rod inside the cylinder to prevent said rod from escaping from cylinder;

a ring is floatingly mounted around the upper portion of the rod above the retaining ring, said floating ring being snugly slidable in the cylinder;

a first spring is mounted inside the cylinder around the rod between the floating ring and the retaining ring; and a second spring is mounted inside the cylinder between said floating ring and said one end of said cylinder closed by the base;

said first and second springs holding said floating ring in a position adjacent the upper end of said rod when the retaining ring rests against the end wall of the cylinder and said first and second springs are uncompressed.

2. A hand drill guide as claimed in claim 1, further comprising a stiffening annular member connected to each of said other ends of said cylinders closed by an end wall.

3. A hand drill guide as claimed in claim 1,
wherein said annular drill holding assembly and said annular positioning head have centers along a common axis;
wherein said head is formed with a cavity opening into the central bore thereof; and
wherein said hand drill guide further comprises:
a center-finding finger;
means mounting one end of said finger in said cavity for pivotal movement thereof, about an axis parallel to said common axis, between a retracted position of said finger and an active position wherein the other end of said finger indicates the center of said head on said common axis;
means for biassing said finger to said retracted position, and
manually operable means for moving said finger into said center-indicating position against said biassing means.

4. A hand drill guide as claimed in claim 3, further comprising stop means in said cavity for arresting movement of said finger when said finger has reached said center-indicating position.

5. A hand drill guide as claimed in claim 4, wherein said manually operable means comprise a piston extending through said positioning head and into said cavity, and
means limiting the stroke of said piston to allow movement of said finger only between said retracted and active positions,
said piston being located adjacent said finger pivoted end.

6. A hand drill guide as claimed in claim 5, wherein said cavity is formed fully to receive said finger with the outer surface thereof flush with said head bore when said finger is in said retracted position.

7. A hand drill guide as claimed in claim 6, further comprising a stiffening annular member connected to each of said other ends of said cylinders closed by an end wall.

8. A hand drill guide as claimed in claim 1,
wherein one of said rods has a plurality of circumferential grooves spaced from each other along its length, and
wherein said hand drill guide further comprises stop means, cooperating with one of said grooves, to limit penetration of a drill bit into said member to be drilled.

9. A hand drill guide as claimed in claim 8, wherein said stop means comprise:
a lock ring slidable over said one rod, said ring being formed with an outwardly open generally triangular transverse slot including two angular sidewalls joined by an arcuate bottom wall having a diameter larger than that of said one ring so as to define, inwardly of the bore of said lock ring, and arcuate release seat; and
a generally angle-shaped resilient lock pin having two straight side legs joined by an arcuate central portion the diameter of which, in uncompressed state of said lock pin, is essentially equal to that of the bottom of said rod groove, said lock pin being constructed so that, in use, said side legs are biassed against said slot sidewalls and said arcuate central portion lies in said rod groove whereby to lock said ring on said one rod,
wherein manual pushing in of said lock pin side legs allows moving of said lock pin arcuate central portion out of said rod groove into said lock ring release seat to free said lock ring from said rod.

10. A hand drill guide as claimed in claim 9, further comprising a stiffening annular member connected to each of said other ends of said cylinders closed by an end wall.

11. A hand drill guide as claimed in claim 10,
wherein said annular drill holding assembly and said annular positioning head have centers along a common axis;
wherein said head is formed with a cavity opening into the central bore thereof; and
wherein said hand drill guide further comprises:
a center-finding finger;
means mounting one end of said finger in said cavity for pivotal movement thereof, about an axis parallel to said common axis, between a retracted position of said finger and an active position wherein the other end of said finger indicates the center of said head on said common axis;
means for biassing said finger to said retracted position, and manually operable means for moving said finger into said center-indicating position against said biassing means.

12. A hand drill guide as claimed in claim 1, wherein said annular positioning head has an outer surface and a pair of diametrically opposed bores each formed with a circumferential groove opening into the respective bore; and wherein said guide further comprises:
an open spring ring lodged into each of said grooves and partially projecting into the respective bore; and
a centering plug slidable in each of the bores, said plug having a pair of spaced circumferential grooves suitable to receive said projecting portion of the open rings of the bore in which it is inserted;
said grooves being constructed to allow positioning said plugs so that said plugs project away from said outer surface for edge drilling, and to allow withdrawing said plugs to set them flush with said outer surface.

13. A hand drill guide as claimed in claim 12, further comprising a stiffening annular member connected to each of said other ends of said cylinders closed by an end wall.

14. A hand drill guide as claimed in claim 13,
wherein said annular drill holding assembly and said annular positioning head have centers along a common axis;
wherein said head is formed with a cavity opening into the central bore thereof;
wherein said guide further comprises:
a center-finding finger;
means mounting one end of said finger in said cavity for pivotal movement thereof, about an axis parallel to said common axis, between a retracted position of said finger and an active position wherein the other end of said finger indicates the center of said head on said common axis;
means for biassing said finger to said retracted position, and
manually operable means for moving said finger into said center-indicating position against said biassing means.

15. A hand drill guide as claimed in claim 14,
wherein one of said rods has a plurality of circumferential grooves spaced from each other along its length, and
wherein said guide further comprises stop means, cooperating with one of said grooves, to limit penetration of a drill bit into said member to be drilled.

16. A hand drill guide as claimed in claim 15, wherein said stop means comprises:
a lock ring slidable over said one rod, said ring being formed with an outwardly open generally triangular transverse slot including two angular sidewalls joined by an arcuate bottom wall having a diameter larger than that of said one ring so as to define, inwardly of the bore of said lock ring, an arcuate release seat; and
a generally angle-shaped resilient lock pin having two straight side legs joined by an arcuate central portion the diameter of which, in uncompressed state of said lock pin, is essentially equal to that of the bottom of said rod groove, said lock pin being constructed so that, in use, said side legs are biassed against said slot sidewalls and said arcuate central portion lies in said rod groove whereby to lock said ring on said one rod,
wherein manual pushing in of said lock pin side legs allows moving of said lock pin arcuate central portion out of said rod groove into said lock ring release seat to free said lock ring from said rod.

17. A telescopic leg assembly comprising:
a hollow cylinder having one closed end and another end closed by an end wall provided with a central opening;
a rod having an upper end, a lower end and an upper portion slidably mounted in said cylinder, said rod extending out of said cylinder through said opening in said end wall;
a retaining ring rigidly connected to the rod at a given distance from its upper end inside the cylinder to prevent said rod from escaping from said cylinder;
a ring floatingly mounted around said upper portion of said rod above said retaining ring, said floating ring being snugly slidable in said cylinder;
a first spring mounted inside the cylinder around the rod between said floating ring and said retaining ring; and
a second spring mounted in the cylinder between said floating ring and said one closed end of said cylinder;
said first and second springs holding said floating ring in a position adjacent the upper end of said rod when said retaining ring rests against the end wall of the cylinder and said first and second springs are uncompressed.

* * * * *